(12) United States Patent
Furukawa

(10) Patent No.: US 10,978,972 B2
(45) Date of Patent: Apr. 13, 2021

(54) ACTUATOR CONTROLLER, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Nobuyuki Furukawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/564,272

(22) Filed: Sep. 9, 2019

(65) Prior Publication Data

US 2020/0091844 A1 Mar. 19, 2020

(30) Foreign Application Priority Data

Sep. 19, 2018 (JP) .............................. JP2018-175205

(51) Int. Cl.
*H02P 6/15* (2016.01)

(52) U.S. Cl.
CPC .................................. *H02P 6/153* (2016.02)

(58) Field of Classification Search
CPC .. H02P 6/00; H02P 6/005; H02P 6/007; H02P 6/04; H02P 6/06; H02P 6/10; H02P 6/12; H02P 6/14; H02P 6/15; H02P 6/153; H02P 6/08; H02P 6/16; H02P 6/26; H02P 6/28; H02P 8/00; H02P 7/00; H02P 7/29; H02P 8/08; H02P 8/14; H02P 8/34; H02P 1/00; H02P 1/04; H02P 1/22; H02P 1/24; H02P 1/26; H02P 1/265; H02P 1/28; H02P 1/38; H02P 1/42; H02P 1/46; H02P 1/48; H02P 3/00; H02P 3/06; H02P 3/065; H02P 3/18; H02P 3/24; H02P 7/06; H02P 23/00; H02P 27/00; H02P 27/04; H02P 27/06; G05B 11/28
USPC ..... 318/400.01, 400.02, 700, 701, 721, 599, 318/799, 800, 811, 430, 432, 400.37, 318/400.38
See application file for complete search history.

(56) References Cited

U.S. PATENT DOCUMENTS

| | | | | |
|---|---|---|---|---|
| 5,982,571 | A * | 11/1999 | Calfee | G11B 21/12 360/70 |
| 6,034,499 | A * | 3/2000 | Tranovich | H02P 6/14 318/254.2 |
| 8,278,853 | B2 * | 10/2012 | Kitagawa | H02P 6/15 318/400.13 |

(Continued)

FOREIGN PATENT DOCUMENTS

JP 2014-128143 A 7/2014

*Primary Examiner* — Antony M Paul
(74) *Attorney, Agent, or Firm* — Venable LLP

(57) ABSTRACT

An actuator controller that is capable of drivingly controlling an actuator, such as a motor, with a sufficient accuracy in spite of a simple configuration while preventing an incorrect detection of switching of a magnetic pole. The actuator controller drivingly controls an actuator having a driving element and a stator. A driver supplies an electric current to a coil provided in the stator so as to drive the driving element. A sensor detects a magnetic field of the driving element so as to detect a position of the driving element. A processor exclusively controls a timing at which the sensor detects the magnetic field and a timing at which the driver supplies the electric current to the coil.

8 Claims, 5 Drawing Sheets

(56) References Cited

U.S. PATENT DOCUMENTS

| | | | |
|---|---|---|---|
| 8,471,511 B2* | 6/2013 | Kitagawa | H02P 27/085 |
| | | | 318/432 |
| 9,553,535 B2 | 1/2017 | Aoshima | |
| 9,941,824 B2* | 4/2018 | Suzuki | A01D 34/90 |
| 2015/0326157 A1 | 11/2015 | Aoshima | |

* cited by examiner

US 10,978,972 B2

ACTUATOR CONTROLLER, CONTROL METHOD THEREFOR, AND STORAGE MEDIUM STORING CONTROL PROGRAM THEREFOR

BACKGROUND OF THE INVENTION

Field of the Invention

The present invention relates to an actuator controller that drivingly controls an actuator, a control method therefor, and a storage medium storing a control program therefor, and in particular, relates to the actuator controller that detects a state of the actuator using a sensor, such as a Hall element, and drivingly controls the actuator on the basis of a detected result.

Description of the Related Art

Generally, a motor, such as a brushless DC motor, is drivingly controlled by detecting a position (state) of a rotor. Then, a magnet provided in a rotor is detected with a sensor like a Hall element for miniaturizing a motor.

For example, there is a known driving system that detects variation of a position of a magnet that constitutes a rotor with a Hall element and controls switching of an electric current supplied to a drive coil on the basis of the detected result so as to drive a motor while preventing step-out (Japanese Laid-Open Patent Publication (Kokai) No. 2014-128143 (JP 2014-128143A)).

In the driving control disclosed in the above publication, a magnetic pole of the magnet that is attached to the rotor is detected with the Hall element. However, a leakage magnetic flux caused by excitation of the drive coil for driving the rotor may add an offset to the output of the Hall element.

For example, when determining switching of energization to the drive coil, a controller detects a position at which the magnetic pole switches to an S pole from an N pole using the Hall element. In this case, when there is a leakage magnetic flux as mentioned above, a detection of the switching of the magnetic pole by the Hall element may delay due to the influence of the leakage magnetic flux. Furthermore, the switching of the magnetic pole may be undetectable.

When such a situation occurs, i.e., when an incorrect detection occurs because the switching of the magnetic pole cannot be detected with a sufficient accuracy, an efficiency lowers significantly and the motor cannot be driven in the worst case.

SUMMARY OF THE INVENTION

The present invention provides an actuator controller, a control method therefor, and a storage medium storing a control program therefor, which are capable of drivingly controlling an actuator, such as a motor, with a sufficient accuracy in spite of a simple configuration while preventing an incorrect detection of switching of a magnetic pole.

Accordingly, a first aspect of the present invention provides an actuator controller that drivingly controls an actuator having a driving element and a stator, the actuator controller including a driver that supplies an electric current to a coil provided in the stator so as to drive the driving element, a sensor that detects a magnetic field of the driving element so as to detect a position of the driving element, and a processor that exclusively controls a timing at which the sensor detects the magnetic field and a timing at which the driver supplies the electric current to the coil.

Accordingly, a second aspect of the present invention provides a control method for an actuator controller that drivingly controls an actuator having a driving element and a stator, the control method including supplying electric current to a coil provided in the stator so as to drive the driving element, detecting a magnetic field of the driving element with a sensor so as to detect a position of the driving element, and exclusively controlling a timing at which the sensor detects the magnetic field and a timing at which the electric current is supplied to the coil.

Accordingly, a third aspect of the present invention provides a non-transitory computer-readable storage medium storing a control program causing a computer to execute the control method of the second aspect.

According to the present invention, an actuator like a motor is drivingly controlled with a sufficient accuracy while preventing an incorrect detection.

Further features of the present invention will become apparent from the following description of exemplary embodiments with reference to the attached drawings.

DESCRIPTION OF THE EMBODIMENTS

Figure 1:
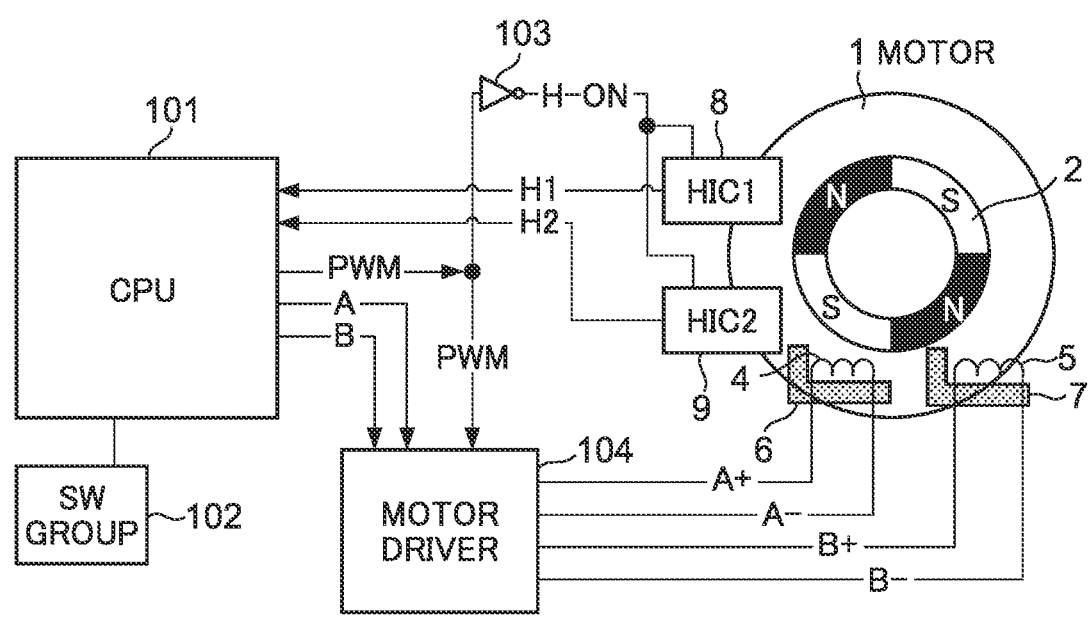
FIG. 1 is a block diagram showing an actuator controller in a first embodiment of the present invention with an actuator.

Hereafter, examples of actuator control apparatuses of embodiments according to the present invention will be described in detail by referring to the drawings.

FIG. 1 is a block diagram showing an actuator controller in a first embodiment of the present invention with an actuator. In the following description, a motor is cited as an example of an actuator. Accordingly, in the description, an actuator controller is referred to as a motor controller.

The motor controller is provided with a control CPU (hereinafter referred to as a CPU, simply) 101 and drivingly controls a motor 1 through a motor driver 104. In this embodiment, the CPU 101 performs PWM control to the motor 1. The motor 1 is provided with a rotor magnet 2 equipped with permanent magnets. The rotor magnet 2 constitutes a rotor as a driving element.

As illustrated, the motor 1 has an A-phase coil 4 and a B-phase coil 5. The A-phase coil 4 and the B-phase coil 5 are respectively wound around a yoke 6 and a yoke 7. The A-phase coil 4 and the B-phase coil 5 are arranged so as to have an electric phase angle of 90 degrees. It should be noted that the A-phase coil 4, the B-phase coil 5, and the yokes 6 and 7 constitute a stator.

A first magnetic sensor circuit (HIC1) 8 and a second magnetic sensor circuit (HIC2) 9 are attached to the motor 1. These first and second magnetic sensor circuits 8 and 9 respectively output a first magnetic-pole-detection signal (H1) and a second magnetic-pole-detection signal (H2) when the magnetic pole of the rotor magnet 2 is detected as mention later. These first and second magnetic-pole-detection signals are given to the CPU 101.

The CPU 101 outputs a PWM signal (first signal) in order to control a rate of ON period of the A-phase coil 4 and B-phase coil 5. Furthermore, the CPU 101 outputs a first control signal "A" for controlling a polarity of the A-phase coil 4 and outputs a second control signal "B" for controlling a polarity of the B-phase coil 5. The PWM signal is input into an inverting circuit 103 and is subjected to an inverting process in the circuit 103. An inverted PWM signal (H-ON signal, second signal) is sent to the first magnetic sensor circuit 8 and the second magnetic sensor circuit 9. It should be noted that the PWM signal, first control signal, and second control signal are input into the motor driver 104.

A switch (SW) group 102 is connected to the CPU 101 as illustrated. The switch group 102 includes a power switch and a start-and-stop switch, for example.

The motor driver 104 drives the motor 1 on the basis of the PWM signal, first control signal, and second control signal. In this example, the motor driver 104 outputs driving signals (driving currents) "A+" and "A−" to the A-phase coil 4 and outputs driving signals "B+" and "B−" to the B-phase coil 5.

Figure 2:
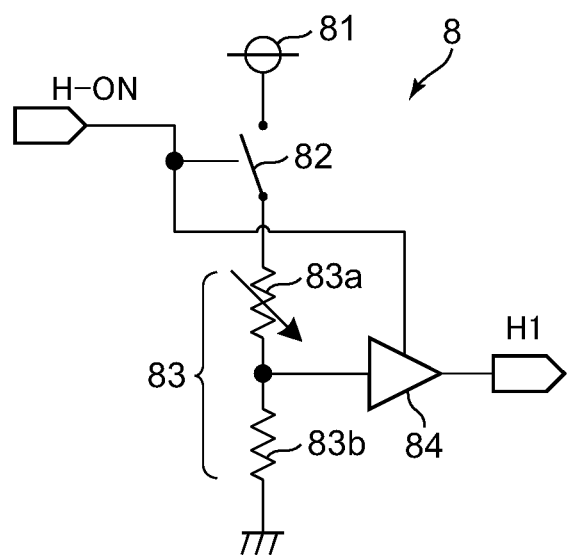
FIG. 2 is a circuit diagram showing an example of a configuration of a first magnetic sensor circuit shown in FIG. 1.

FIG. 2 is a circuit diagram showing an example of a configuration of the first magnetic sensor circuit 8 shown in FIG. 1. It should be noted that the second magnetic sensor circuit 9 shown in FIG. 1 has the same configuration as the first magnetic sensor circuit 8.

The first magnetic sensor circuit 8 is a Hall IC that is configured by integrating a plurality of circuit elements into one IC. The first magnetic sensor circuit 8 has a switch 82. ON and OFF of the switch 82 is controlled by the inverted PWM signal (H-ON signal). A power source 81 and a Hall element circuit 83 are connected to the switch 82. When the switch 82 turns ON, the power source 81 is connected to the Hall element circuit 83.

The Hall element circuit 83 has a Hall element 83a and a resistance 83b. In this example, the Hall element 83a and the resistance 83b are connected in series. It should be noted that the Hall element may be constituted as an H bridge so as to change the output.

An amplifier 84 is connected to a node of the Hall element 83a and the resistance 83b. The amplifier 84 receives the output of the Hall element circuit 83 and converts the output concerned into a digital output. When the H-ON signal is High (high level), the amplifier 84 converts the output of the Hall element circuit 83 into a digital signal H1 and outputs it. In the meantime, when the H-ON signal is Low (low level), the amplifier 84 holds the digital signal H1 that is the last output.

It should be noted that the second magnetic sensor circuit 9 operates like the first magnetic sensor circuit 8 and outputs a digital signal H2 when the H-ON signal is High. Moreover, although the illustrated example is configured so that the first and second magnetic sensor circuits 8 and 9 will output the digital signals, the output (analog output) of the Hall element circuit 83 may be given to the CPU 101. In this case, the CPU 101 performs an A/D conversion process.

Figure 3:
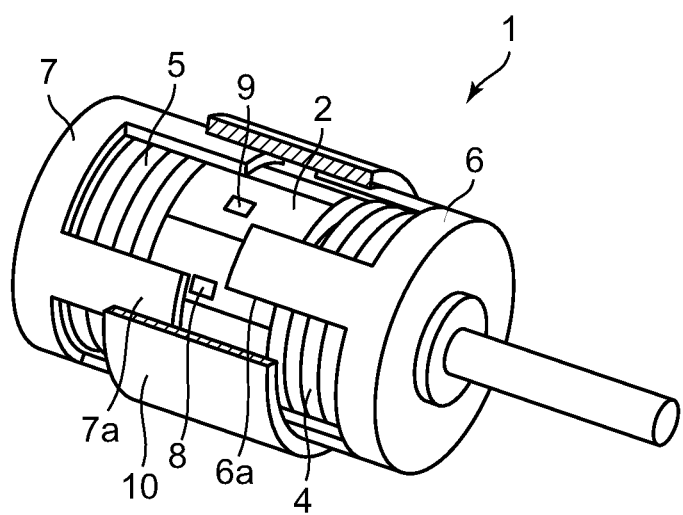
FIG. 3 is a schematic view showing an appearance of a motor shown in FIG. 1.

FIG. 3 is a schematic view showing an appearance of the motor 1 shown in FIG. 1.

As mentioned above, the motor 1 has the rotor magnet 2. The rotor magnet 2 is formed in a cylindrical shape. The rotor magnet 2 is divided into a plurality of portions in a circumferential direction along an outer circumferential surface and the plurality of portions are magnetized to multiple magnetic poles alternately. That is, the rotor magnet 2 is magnetized to different poles at predetermined intervals. In the illustrated example in FIG. 3, the rotor magnet 2 is divided into eight portions, i.e., is magnetized to eight poles. It should be noted that the number of poles is not limited to eight, the rotor magnet 2 may be magnetized to four poles or twelve poles, for example.

The A-phase coil 4 is arranged on the right side of the rotor magnet 2 and the B-phase coil 5 is arranged on the left side that is the opposite side of the right side across the rotor magnet 2. The yoke 6 for the A phase is formed from soft magnetic material and faces the outer circumferential surface of the rotor magnet 2 with a gap. The yoke 6 has a plurality of magnetic pole parts 6a that are extended from an annular body in an axial direction and are arranged at predetermined intervals in the circumferential direction. The magnetic pole parts 6a will be magnetized when an electric current is supplied to the A-phase coil 4.

It should be noted that the yoke 7 for the B phase is constituted like the yoke 6 and is provided with B-phase magnetic pole parts 7a.

Torque given to the rotor magnet 2 is changed by switching the magnetic poles (N pole and the S pole) that appear in the magnetic pole parts 6a and 7a. Each of the first magnetic sensor circuit 8 and the second magnetic sensor circuit 9 detects the magnetic flux of the rotor magnet 2 and is fixed to an inner surface of a cover 10 (shown by breaking partially) of the motor 1.

Figure 4:
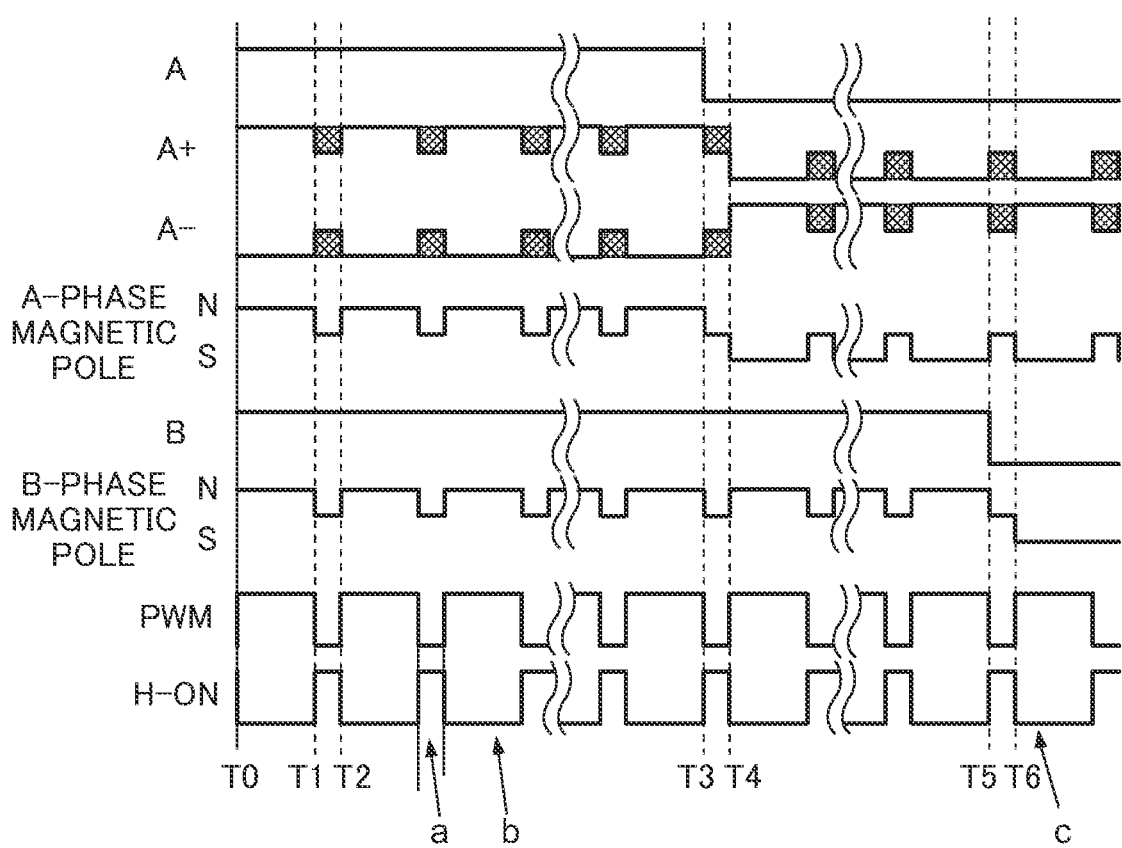
FIG. 4 is a timing chart of signals for driving the motor shown in FIG. 1.

FIG. 4 is a timing chart of signals for driving the motor 1 shown in FIG. 1.

As described in relation to FIG. 1, the CPU 101 outputs the PWM signal, first control signal A, and second control signal B. As shown in FIG. 4, the CPU 101 sets the first control signal A to the high level (High) at a timing T0. As a result of this, the motor driver 104 sets the driving signal "A+" to High and sets the driving signal "A−" to the low level (Low).

When the driving signal "A+" becomes High and the driving signal "A−" becomes Low, the A-phase magnetic pole parts 6a are magnetized to the N pole by means of the A-phase coil 4 and A-phase yoke 6. At the timing T0, since the CPU 101 sets the second control signal B to High, the B-phase magnetic pole parts 7a are magnetized to the N pole similarly.

Next, the CPU 101 changes the PWM signal to Low from High at a timing T1. The rate of ON period of the A-phase coil 4 and B-phase coil 5 is controlled by the PWM signal. For example, when 75% of the electric power is supplied to the coils for driving, the PWM signal should be High in 75% of a unit period and should be Low in the remaining 25%.

In the illustrated example, the CPU 101 sets the PWM signal to Low in a period between the timings T1 and T2 that is one third of the period between the timings T0 and T1. As a result of this, 75% of the electric power is supplied to the A-phase coil 4 and B-phase coil 5 from the timing T0 to the timing T2.

When the PWM signal becomes Low, the motor driver 104 stops outputting the driving signals "A+" and "A−". A hatched part in FIG. 4 represents a high impedance state appeared as a result of stopping the outputs of the motor driver 4. When the A-phase coil 4 is in the high impedance state, the electric current does not flow into the A-phase coil 4, and accordingly, no magnetic field occurs. Accordingly, a magnetic pole is not formed in the A-phase magnetic pole parts 6a. It should be noted that the B-phase coil 5 is controlled as well as the A-phase coil 4.

At the timing T2, the CPU 101 sets the PWM signal to High again. In the meantime, since the first control signal A and second control signal B are still High, the A-phase magnetic pole parts 6a and B-phase magnetic pole parts 7a are magnetized to the N pole as mentioned above. Then, the same control is repeated until a timing T3.

At the timing T3, the CPU 101 sets the first control signal A to Low in order to switch the polarity of the A-phase coil 4 from the N pole to the S pole. However, since the PWM signal becomes Low at the timing T3, the A-phase coil 4 and B-phase coil 5 are in the high impedance state and no magnetic pole is formed.

At a timing T2, the CPU 101 sets the PWM signal to High. Then, when the driving signal "A+" becomes Low and the driving signal "A−" becomes High, the A-phase coil 4 becomes the S pole and the A-phase magnetic pole parts 6a are magnetized to the S pole. Then, since the control that changes the PWM signal from High to Low and from Low to High is repeated, the A-phase magnetic pole parts 6a are in the S-pole state or the non-magnetic state.

The switching timing of the first control signal A is matched with the timing at which the PWM signal becomes Low (OFF) in the illustrated example, these timings may differ.

At the timing T3, the CPU 101 sets the second control signal B to Low in order to switch the polarity of the B-phase coil 5 from the N pole to the S pole. Since the PWM signal becomes Low at this time, the A-phase coil 4 and B-phase coil 5 are in the high impedance state and no magnetic pole is formed.

At a timing T6, the CPU 101 sets the PWM signal to High. When the driving signal "B+" becomes Low and the driving signal "B−" becomes High, the B-phase coil 5 becomes the S pole and the B-phase magnetic pole parts 7a are magnetized to the S pole. Then, since the control that changes the PWM signal from High to Low and from Low to High is repeated, the B-phase magnetic pole parts 7a are in the S-pole state or the non-magnetic state.

Figure 5A:
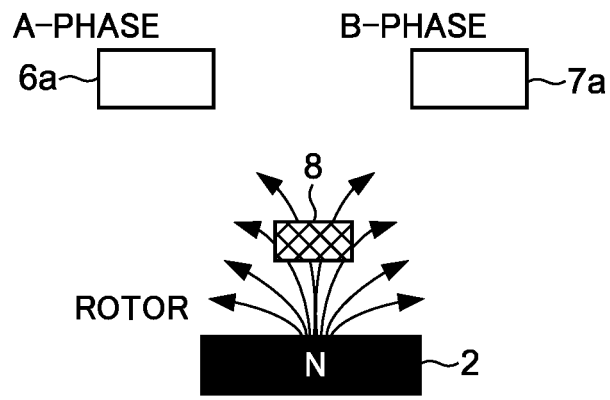
FIG. 5A, FIG. 5B, and FIG. 5C are views for describing a principle of drive of the motor shown in FIG. 1.
Figure 5B:
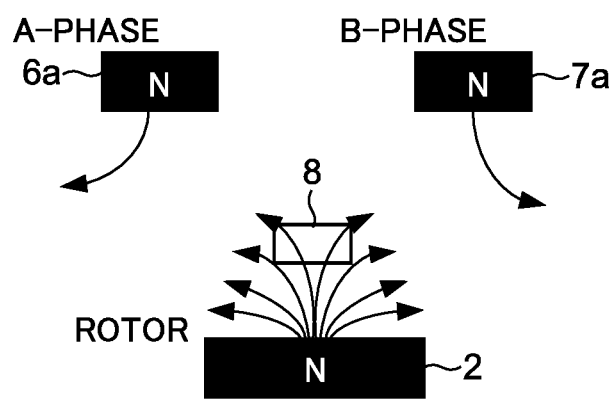
Figure 5C:
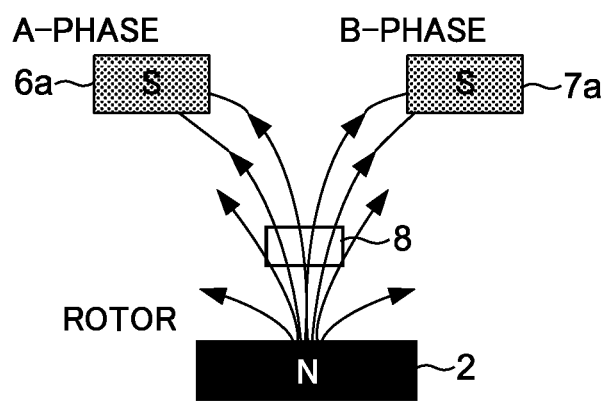

FIG. 5A, FIG. 5B, and FIG. 5C are views for describing a principle of drive of the motor shown in FIG. 1. FIG. 5A is a view showing a state where the PWM signal is Low and the electric current is supplied to the A-phase coil and B-phase coil. Moreover, FIG. 5B is a view showing a state where the PWM signal is High and the electric current is supplied to the A-phase coil and B-phase coil. Furthermore, FIG. 5C is a view showing a state where the PWM signal is High and the electric current is supplied to the A-phase coil and B-phase coil in the direction opposite to the direction in FIG. 5B.

In the following description, a case where the first magnetic sensor circuit 8 detects the N pole of the rotor magnet 2 in response to ON and OFF of the PWM signal and the H-ON signal will be described.

FIG. 5A shows a state in a period "a" shown in FIG. 4. Since no electric current is supplied to the A-phase coil 4 and the B-phase coil 5, the A-phase magnetic pole parts 6a and B-phase magnetic pole parts 7a are not magnetized. Accordingly, since the N pole of the rotor magnet 2 forms a magnetic field without being influenced by a leakage magnetic flux from the outside, the first magnetic sensor circuit 8 detects the magnetic field of the rotor magnet 2 appropriately. It should be noted that four magnetic field lines pass through the first magnetic sensor circuit 8 in FIG. 5A.

FIG. 5B shows a state in a period "b" shown in FIG. 4. Since the electric current is supplied to the A-phase coil 4 and the B-phase coil 5 in the direction so as to form the N pole, the A-phase magnetic pole parts 6a and B-phase magnetic pole parts 7a become the N pole. The magnetic field formed by the N pole of the rotor magnet 2 is influenced by the leakage magnetic fluxes of the A-phase coil 4 and B-phase coil 5. That is, since the magnetic field by the N pole of the rotor magnet 2 is pushed away by the leakage magnetic flux, a magnetic field weaker than that in FIG. 5A is applied to the first magnetic sensor circuit 8. It should be noted that two magnetic field lines pass through the first magnetic sensor circuit 8 in FIG. 5B.

FIG. 5C shows a state in a period "c" shown in FIG. 4. Since the electric current is supplied to the A-phase coil 4 and the B-phase coil 5 in the direction so as to form the S pole, the A-phase magnetic pole parts 6a and B-phase magnetic pole parts 7a become the S pole. The magnetic field formed by the N pole of the rotor magnet 2 is influenced by the leakage magnetic fluxes of the A-phase coil 4 and B-phase coil 5. That is, since the magnetic field by the N pole of the rotor magnet 2 is pulled by the leakage magnetic flux, a magnetic field stronger than that in FIG. 5A is applied to the first magnetic sensor circuit 8. It should be noted that six magnetic field lines pass through the first magnetic sensor circuit 8 in FIG. 5C.

As illustrated in FIG. 4, the H-ON signal is output in a level inverted to the PWM signal. That is, the first magnetic sensor circuit 8 detects a magnetic field only when the H-ON signal is High (i.e., only when the PWM signal is Low). As a result, the first magnetic sensor circuit 8 is exclusively controlled with respect to the A-phase coil 4 and B-phase coil 5, and detects a magnetic field in the state where there is no influence of an external magnetic field as shown in FIG. 5A. When the H-ON signal is Low, the first magnetic sensor circuit 8 outputs the digital signal H1 corresponding to the magnetic field detected immediately before. That is, the output of the first magnetic sensor circuit 8 does not vary when the PWM signal is High.

It should be noted that FIG. 5A, FIG. 5B, and FIG. 5C show the case where both of the first control signal A and the second control signal B are High or Low. In the meantime, in some periods, such as a period from the timing T3 to the timing T4, one of the control signals A and B is High and the other is Low. Since the influence of the coil magnetic field given to the magnetic sensor circuit in such periods is smaller than that in a period in which both the control signals A and B are High or a period in which the both are Low, a detailed description is omitted.

Although the detection by the first magnetic sensor circuit 8 is described in FIG. 5A, FIG. 5B, and FIG. 5C, the second magnetic sensor circuit 9 detects a magnetic field similarly. That is, since the first magnetic sensor circuit 8 and second magnetic sensor circuit 9 detect the rotor magnet 2 only when the PWM signal is Low, they can detect the rotor magnet 2 with sufficient accuracy while preventing the influence of the external magnetic field.

As described above, even when the magnetic sensor circuit is arranged at a position that is influenced by the coil magnetic field, the magnetic pole of the rotor magnet is detected with the sufficient accuracy in the first embodiment of the present invention.

Subsequently, one example of a motor controller according to a second embodiment of the present invention will be described.

Figure 6:
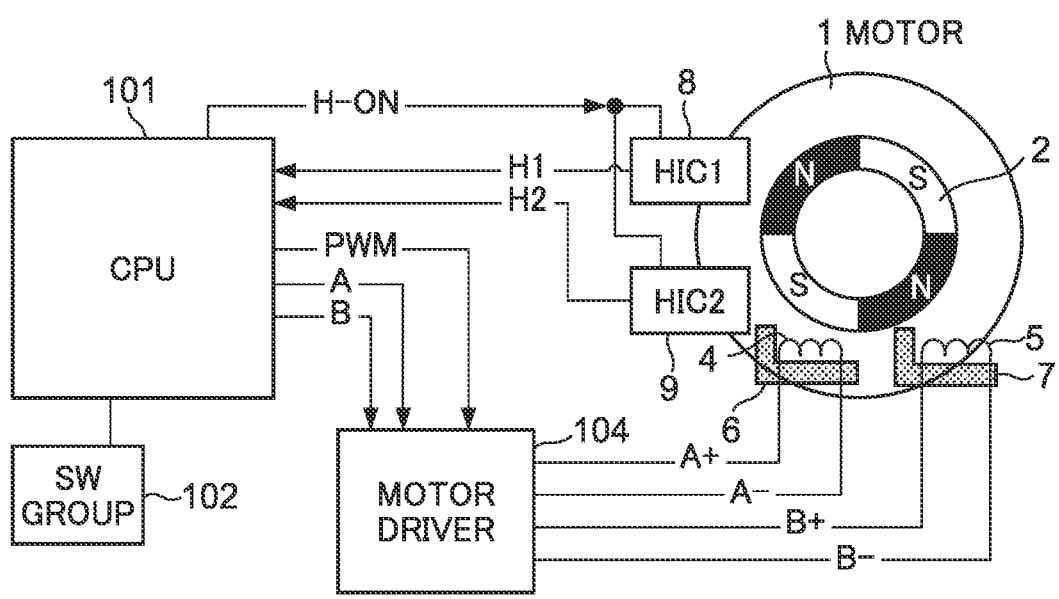
FIG. 6 is a block diagram showing a motor controller in a second embodiment of the present invention with a motor.

FIG. 6 is a block diagram showing the motor controller in the second embodiment of the present invention with a motor. It should be noted that the same reference numerals are assigned to components in FIG. 6 that are the same as the components of the example shown in FIG. 1.

The motor that rotates in a comparatively low speed is described in the above-mentioned first embodiment. In the meantime, the higher the rotation speed of the motor becomes, the larger the influence of time constants of the A-phase coil 4 and B-phase coil 5 becomes. Accordingly, the time constants of the A-phase coil 4 and B-phase coil 5 are taken into consideration in the second embodiment.

In the example shown in FIG. 6, the inverting circuit 103 shown in FIG. 1 is deleted and the CPU 101 outputs the H-ON signal to the first magnetic sensor circuit 8 and second magnetic sensor circuit 9 as mentioned below. The CPU 101 controls output timings of the PWM signal and H-ON signal so that the H-ON signal will not become High at the same time of switching the PWM signal to Low.

Although the CPU 101 controls the timings of the PWM signal and H-ON signal in the example shown in FIG. 6, a delay circuit may be arranged together with the inverting circuit 103 in FIG. 1 so as to shift the timing at which the H-ON signal becomes High.

Figure 7:
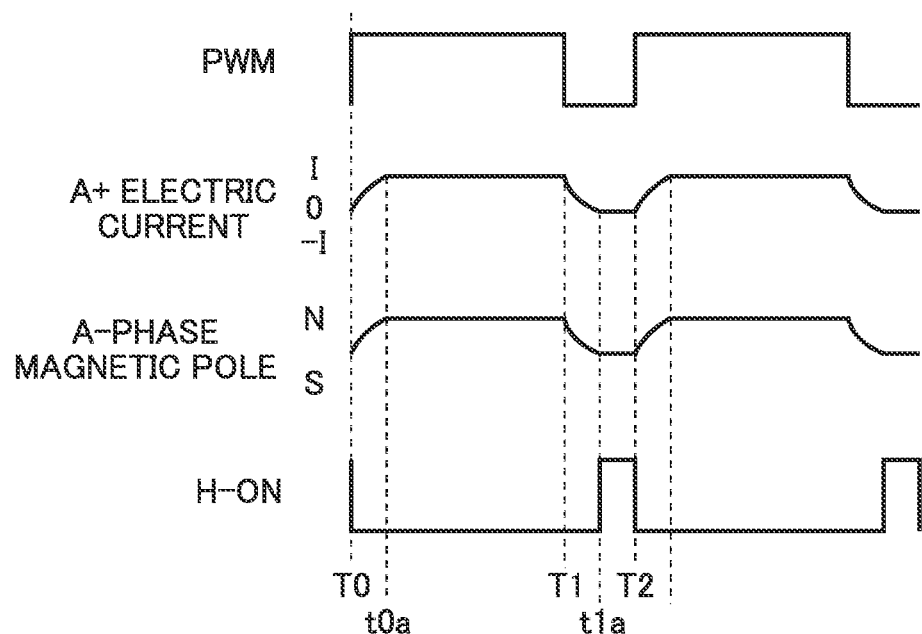
FIG. 7 is a timing chart of signals for driving the motor shown in FIG. 6.

FIG. 7 is a timing chart of signals for driving the motor shown in FIG. 6. It should be noted that FIG. 7 shows only parts different from FIG. 4.

The timings T0, T1, and T2 are the same as the timings shown in FIG. 4. At the timing T0, the CPU 101 sets the PWM signal to High (turns ON) and sets the H-ON signal to Low (turns OFF). As a result, the first magnetic sensor circuit 8 and second magnetic sensor circuit 9 do not detect a magnetic field.

In the meantime, when the PWM signal becomes High, the motor driver 104 supplies the electric current to the A-phase coil 4 by setting the driving signal "A+" to High and by setting the driving signal "A−" to Low. Although the electric current that flows through the A-phase coil 4 is maximized promptly in the first embodiment, the electric current that flows through the A-phase coil 4 is not maximized promptly due to the time constant of the A-phase coil 4 when the rotation speed of the motor is high.

As shown by the electric current "A+" in FIG. 7, the electric current rises according to the time constant and a time is required until the electric current is maximized. As a result, the magnetic force of the N pole by the A-phase magnetic pole parts 6$a$ is maximized at a timing t0$a$. Then, the state shown in FIG. 5B is achieved after the timing t0$a$.

Subsequently, the CPU 101 sets the PWM signal to Low (turns OFF) at the timing T1. As a result, as shown in FIG. 7, the electric current "A+" and the magnetic force caused by the A-phase magnetic pole parts 6$a$ decrease according to the time constant. Then, when the period according to the time constant elapses, the electric current "A+" and the magnetic force caused by the A-phase magnetic pole parts 6$a$ become zero at a timing t1$a$.

Since there is no influence of a leakage magnetic flux when the magnetic force caused by the A-phase magnetic pole parts 6$a$ becomes zero, the CPU 101 sets the H-ON signal to High (turns ON) at this timing. As a result of this, the state shown in FIG. 5A is achieved.

In the meantime, the timing at which the H-ON signal is set to High may be delayed from the timing t1$a$. For example, the period from the timing at which the PWM signal becomes Low to the timing at which the H-ON signal becomes High can be longer than the time constant by considering a margin for disturbance and variation of the time constant due to variation in the A-phase coil 4 or the B-phase coil 5. That is, it is enough to secure a sufficient period for a magnetic sensor circuit to detect a magnetic pole between the timings t1$a$ and T2.

Next, the CPU 101 stops detecting the magnetic pole at the timing T2 by setting the H-ON signal to Low and by setting the PWM signal to Hight.

In this way, since the level of the H-ON signal is controlled according to the time constants of the coils in the second embodiment of the present invention, the magnetic pole of the rotor magnet is detectable with the sufficient accuracy irrespective of the time constants of the A-phase coil 4 and B-phase coil 5.

In the example shown in FIG. 1, the first magnetic sensor circuit 8 and second magnetic sensor circuit 9 function as a sensor, and the CPU 101 and motor driver 104 function as a driver. Moreover, the CPU 101 and inverting circuit 103 function as a processor.

Although the present invention has been described on the basis of the embodiments, the present invention is not limited to such embodiments and includes various configurations in the scope that does not deviate from the gist of the invention.

For example, the functions of the above-mentioned embodiments may be achieved as a control method that is executed by the actuator controller. Moreover, the functions of the above-mentioned embodiments may be achieved as a control program that is executed by a computer of the actuator controller. It should be noted that the control program is recorded on computer-readable storage medium, for example.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-175205, filed Sep. 19, 2018, which is hereby incorporated by reference herein in its entirety.

What is claimed is:

1. An actuator controller that drivingly controls an actuator having a driving element and a stator, the actuator controller comprising:
    a driver that supplies an electric current to a coil provided in the stator so as to drive the driving element;
    a sensor that detects a magnetic field of the driving element so as to detect a position of the driving element; and
    a processor that exclusively controls a timing at which the sensor detects the magnetic field and a timing at which the driver supplies the electric current to the coil,
    wherein the processor outputs a first signal to the driver for controlling the timing at which the driver supplies the electric current to the coil, and
    wherein the processor outputs a second signal to the sensor for driving the sensor at a timing exclusive of the first signal.

2. The actuator controller according to claim 1, wherein the driving element is magnetized in different poles at predetermined intervals, and
    wherein the processor controls the electric current supplied to the coil according to a detection result of the sensor.

3. The actuator controller according to claim 1, wherein the processor comprises an inverting circuit that generates the second signal by inverting the first signal.

4. The actuator controller according to claim 1, wherein the driver controls the actuator by PWM control.

5. The actuator controller according to claim 1, wherein the processor turns on the second signal when at least a period corresponding to a time constant of the coil elapses after turning off the first signal.

6. The actuator controller according to claim 1, wherein the sensor outputs a detection result that has been detected in the last ON time of the second signal in a case where the second signal is OFF.

7. A control method for an actuator controller that drivingly controls an actuator having a driving element and a stator, the control method comprising:
    supplying electric current to a coil provided in the stator so as to drive the driving element;
    detecting a magnetic field of the driving element with a sensor so as to detect a position of the driving element; and
    exclusively controlling a timing at which the sensor detects the magnetic field and a timing at which the electric current is supplied to the coil,
    wherein the controlling the timing comprises outputting a first signal for controlling the timing at which the electric current is supplied to the coil, and
    outputting a second signal to the sensor for driving the sensor at a timing exclusive of the first signal.

8. A non-transitory computer-readable storage medium storing a control program causing a computer to execute a control method for an actuator controller that drivingly controls an actuator having a driving element and a stator, the control method comprising:
    supplying electric current to a coil provided in the stator so as to drive the driving element;
    detecting a magnetic field of the driving element with a sensor so as to detect a position of the driving element; and
    exclusively controlling a timing at which the sensor detects the magnetic field and a timing at which the electric current is supplied to the coil,
    wherein the controlling the timing comprises outputting a first signal for controlling the timing at which the electric current is supplied to the coil, and
    outputting a second signal to the sensor for driving the sensor at a timing exclusive of the first signal.

* * * * *